C. H. HARRINGTON.
PEANUT STEMMER.
APPLICATION FILED MAR. 16, 1916.
1,195,812.
Patented Aug. 22, 1916.
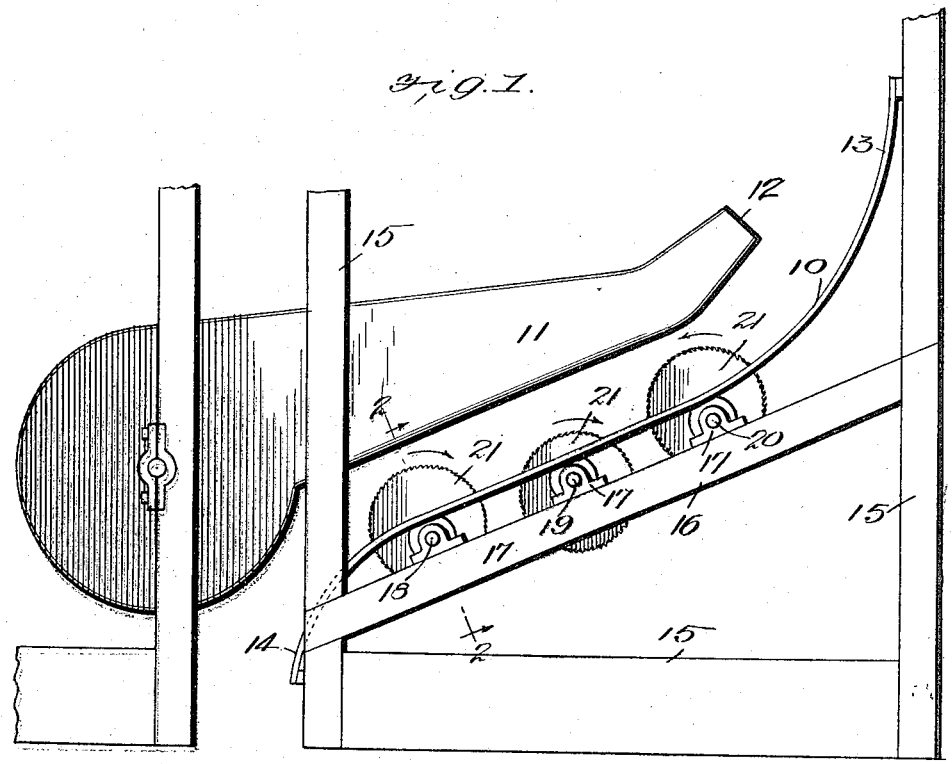
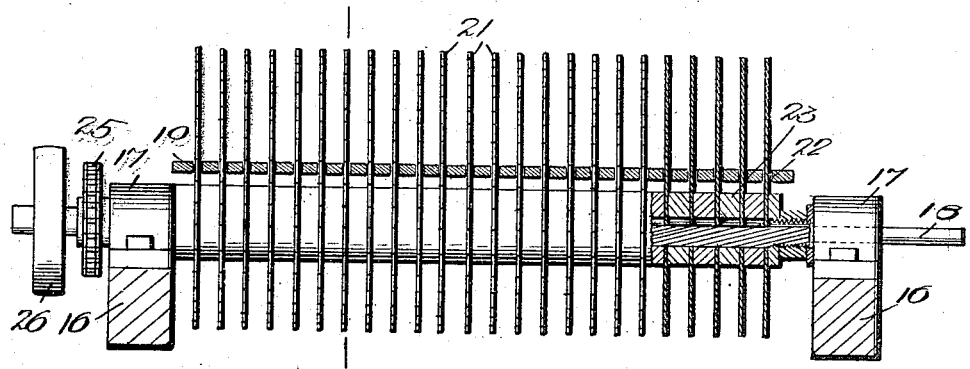
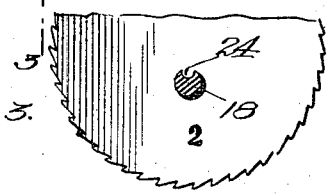
WITNESSES:
INVENTOR
Cecil H. Harrington
BY
ATTORNEYS

UNITED STATES PATENT OFFICE.

CECIL H. HARRINGTON, OF SUFFOLK, VIRGINIA, ASSIGNOR TO BENTHALL MACHINE CO., OF SUFFOLK, VIRGINIA, A CORPORATION OF VIRGINIA.

PEANUT-STEMMER.

1,195,812.　　　　Specification of Letters Patent.　　Patented Aug. 22, 1916.

Application filed March 16, 1916. Serial No. 84,649.

*To all whom it may concern:*

Be it known that I, CECIL H. HARRINGTON, a citizen of the United States, and a resident of Suffolk, in the county of Nansemond and State of Virginia, have invented a certain new and useful Improvement in Peanut-Stemmers, of which the following is a specification.

My invention relates generally to stemming devices for peanuts, forming part of the threshing apparatus therefor, and particularly to an apparatus of this type including a breast plate downwardly inclined and upon which the peanuts with their stems are fed, together with a plurality of series of stemming saws projecting through conformable slotted openings in the breast plate for the purpose of attacking the mass of peanuts and in working therethrough, removing the stems thereof. In this operation it is important that the mass of peanuts with their stems be agitated in order that the peanuts individually will be turned and twisted and assume various positions relative to the saws in their passage across the series thereof, and it has been before proposed to accomplish this by vibratory motion of the breast plate.

In practice, however, the agitation of the mass of peanuts by this means has been found insufficient for the purpose, and it is the primary object of my present improvement to increase the agitation by continuous adjustment of the stemming saws themselves with respect to the mass of peanuts, and thus indirectly increase the effectiveness of the saws in their stemming operation. The means by which these objects are accomplished, and the advantages attained thereby, will be more apparent from the following description, reference being made to the accompanying drawing illustrating my present improvement and forming a part of this specification, and wherein—

Figure 1 is a side elevation of a stemming apparatus, constructed in accordance with my present improvement. Fig. 2 is a vertical transverse section taken substantially on line 2—2 of Fig. 1. Fig. 3 is a detail cross section through the series of stemming saws shown in Fig. 2, taken substantially on line 3—3 of said figure.

Referring now to the figures, a breast plate 10 is curved and inclined below the fan spout 11, the blast from the mouth 12 of which spout acts to remove a considerable proportion of the dirt from the mass of peanuts fed onto the upwardly curved end 13 of the breast plate. In the present instance, as shown, the breast plate 10 is stationarily supported, and connected for this purpose at the extremities of its upwardly and downwardly curved ends 13 and 14, to adjacent portions of the supporting framework 15, which framework includes the inclined supporting beams 16, below and adjacent opposite sides, of the breast plate 10, and carrying bearings 17 for the transverse saw shafts 18, 19, and 20, upon each of which an alined spaced series of saws 21 is mounted.

The saw shafts extend below the breast plate 10 and the saws 21 thereof project upwardly through slotted openings 22 in the breast plate conformable thereto, and for the purpose of continuously agitating the mass of peanuts traveling downwardly upon the breast plate 10, the several series of saws 21 are eccentrically mounted upon their respective shafts, as plainly seen by reference to Figs. 1 and 3.

From Figs. 2 and 3 it will be noted that the several saws of each series are spaced apart by spacing blocks 23 upon the respective shafts, each shaft having a longitudinal groove into which a key lip 24 of each saw projects in order to secure the saw with respect to the shaft. It will also be noted particularly from Fig. 1, that the saws 21 of each series are alined, and that the direction of greatest length of the series of saws of the intermediate shaft 19 are in a direction opposite to that of the series of saws 21 of the outer shafts 18 and 20, so that the saws of the intermediate shaft rise and fall alternately with the saws of the series of the outer shafts 18 and 20, thus increasing the agitative action upon the mass of peanuts, the several shafts 18, 19 and 20 being gearedly connected by suitable means as for instance, sprocket wheels and chains 25, one of the shafts having a pulley 26 as seen in Fig. 2, by which rotative power is received from a suitable source.

I claim:—

1. A peanut stemmer including a plurality of series of stemming saws, a shaft upon which the saws of each series are eccentrically mounted in spaced alined relation, the saws of certain of the series having their direction of greatest length from their shafts opposite to those saws of the other series, and a stationary breast plate above the several shafts having slots through which the saws of the several series partially project.

2. A peanut stemmer including a plurality of series of stemming saws, a shaft upon which the saws of each series are eccentrically mounted in spaced alined relation, the saws of certain of the series rising and falling alternately with the rise and fall of the saws of the other series, and a stationary breast plate above the several shafts having slots through which the saws of the several series project.

3. A peanut stemmer including a plurality of series of irregularly rising and falling saws, shafts upon which said saws are eccentrically mounted, and a stationary inclined breast plate on which the peanuts are fed having slots through which the saws partially project.

4. A peanut stemmer including a plurality of series of eccentrically mounted saws, shafts upon which said saws are mounted, and a stationary inclined breast plate on which the peanuts are fed having slots through which the saws of the several series partially project.

5. A peanut stemmer including a slotted and inclined stationary breast plate downwardly upon which the peanuts are fed, and series of stemming saws irregularly rising and falling through the slots of said breast plate.

6. A peanut stemmer including a slotted and inclined stationary breast plate downwardly upon which the peanuts are fed, and series of stemming saws rising and falling through the slots of said breast plate.

CECIL H. HARRINGTON.

Copies of this patent may be obtained for five cents each, by addressing the "Commissioner of Patents, Washington, D. C."